United States Patent
Matsuzaki et al.

(10) Patent No.: US 11,230,252 B2
(45) Date of Patent: Jan. 25, 2022

(54) SIDE AIRBAG APPARATUS

(71) Applicants: NHK SPRING CO., LTD, Yokohama (JP); Subaru Corporation, Tokyo (JP)

(72) Inventors: Taisuke Matsuzaki, Yokohama (JP); Hideki Hasumi, Yokohama (JP); Youhei Kanbara, Tokyo (JP); Yuuji Matsubara, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 15 days.

(21) Appl. No.: 16/851,447

(22) Filed: Apr. 17, 2020

(65) Prior Publication Data

US 2020/0331422 A1 Oct. 22, 2020

(30) Foreign Application Priority Data

Apr. 18, 2019 (JP) .............................. JP2019-079559

(51) Int. Cl.
*B60R 21/231* (2011.01)
*B60R 21/01* (2006.01)

(52) U.S. Cl.
CPC ........ *B60R 21/23138* (2013.01); *B60R 21/01* (2013.01); *B60R 2021/01006* (2013.01); *B60R 2021/23153* (2013.01)

(58) Field of Classification Search
CPC . B60R 21/23138; B60R 21/207; B60R 21/01; B60R 2021/23153; B60R 2021/01006; B60R 21/2171; B60R 16/0215; B60R 21/017
See application file for complete search history.

(56) References Cited

U.S. PATENT DOCUMENTS

| 5,273,309 A * | 12/1993 | Lau ....................... B60R 21/213 |
| | | 280/730.2 |
| 5,556,127 A * | 9/1996 | Hurford ................ B60R 21/201 |
| | | 280/728.2 |
| 5,707,076 A * | 1/1998 | Takahashi ........... B60R 21/0136 |
| | | 180/274 |

(Continued)

FOREIGN PATENT DOCUMENTS

| JP | 2000095052 A | * | 4/2000 |
| JP | 3590713 B2 | * | 11/2004 |

(Continued)

OTHER PUBLICATIONS

Machine Translation of JP3590713 (Year: 2004).*
Machine Translation of WO2016010011 (Year: 2016).*

*Primary Examiner* — Paul N Dickson
*Assistant Examiner* — Kurtis Nielson
(74) *Attorney, Agent, or Firm* — Flynn Thiel, P.C.

(57) ABSTRACT

A side airbag apparatus has an inflatable side airbag, an inflator which supplies the side airbag with gas, a base member in which the folded side airbag and inflator are accommodated, and a harness connected to the inflator to supply it with power for ignition. The base member has a backside surface which faces an inside of the seat, a frontside surface, a protrusion portion formed on the frontside surface, and a harness supporting portion below the protrusion portion which fixes a portion of the harness so as to restrict lateral and vertical movements of the harness relative to the frontside surface.

9 Claims, 6 Drawing Sheets

(56) References Cited

U.S. PATENT DOCUMENTS

| | | | | |
|---|---|---|---|---|
| 5,816,660 A * | 10/1998 | Johnson, III | ......... | B60N 2/5841 |
| | | | | 297/452.38 |
| 5,829,779 A * | 11/1998 | Nakashima | ........... | B60R 21/237 |
| | | | | 280/730.2 |
| 5,924,724 A * | 7/1999 | Nakamura | ........ | B60R 21/23138 |
| | | | | 280/730.2 |
| 5,992,882 A * | 11/1999 | Ito | ......................... | B60R 21/207 |
| | | | | 280/728.1 |
| 6,189,916 B1 * | 2/2001 | Bowers | ................. | B60R 21/207 |
| | | | | 280/728.2 |
| 6,196,577 B1 * | 3/2001 | Aoki | ..................... | B60R 21/207 |
| | | | | 280/730.1 |
| 6,231,069 B1 * | 5/2001 | Yokoyama | ........ | B60R 21/23138 |
| | | | | 280/730.2 |
| 6,612,610 B1 * | 9/2003 | Aoki | ..................... | B60R 21/201 |
| | | | | 280/730.2 |
| 2017/0043741 A1 * | 2/2017 | Kobayashi | ............... | B60N 2/42 |
| 2017/0174169 A1 * | 6/2017 | Tanabe | ................ | B60R 21/2171 |
| 2018/0118149 A1 * | 5/2018 | Odai | .................... | B60R 21/206 |
| 2018/0222427 A1 * | 8/2018 | Tanabe | .................. | B60R 21/207 |
| 2019/0168704 A1 * | 6/2019 | Wiscombe | ............ | B60R 21/237 |
| 2020/0391687 A1 * | 12/2020 | Negishi | ................. | B60R 21/207 |
| 2020/0391692 A1 * | 12/2020 | Hashimoto | ............ | B60R 21/207 |

FOREIGN PATENT DOCUMENTS

| | | | | | |
|---|---|---|---|---|---|
| JP | 2015009623 A | * | 1/2015 | ......... | B60R 21/2171 |
| JP | 201620147 A | | 2/2016 | | |
| KR | 20080101478 A | * | 11/2008 | | |
| KR | 101262976 B1 | * | 5/2013 | | |
| WO | WO-2016010011 A1 | * | 1/2016 | ........... | B60R 21/207 |

* cited by examiner

SIDE AIRBAG APPARATUS

TECHNICAL FIELD

The present invention relates to a side airbag apparatus, and, in particular, relates to such a side airbag apparatus which is capable of efficiently mounting a harness without badly influencing a durability of the harness.

BACKGROUND

Conventionally, a seat for a vehicle, an automobile, for instance, with a side airbag which is interposed between a vehicle body and a passenger to absorb an impact upon a side collision of the vehicle, has been widely used.

Such a side airbag is disposed between a vehicle door and a rear seat in a widthwise direction of the vehicle, and includes an inflator which fills gas into the side airbag, an accommodating case of a box type which accommodates the side airbag and the inflator, and a base cover made of resin which covers the accommodating case from a front side of the vehicle, whereby the side airbag is adapted to destroy a thin portion of the base cover at the front side of the vehicle when the side airbag accommodated in the accommodating case is expanded by the inflator.

More specifically, the inflator and a battery for the vehicle provided on the vehicle body are electrically connected by a harness, so that the inflator is supplied with power for ignition from the battery for the vehicle via the harness in a case where an impact of a value larger than the predetermined value is applied to the vehicle, and thus, the side airbag is caused to expand at the side of the passenger.

In particular, the side airbag disposed between the vehicle body and the rear seat which is capable of appropriately supporting the harness with a component associated with the side airbag, is disclosed by Japanese Patent Laid-open Publication 2016-20147, for instance.

Such a side airbag includes the harness disposed between the vehicle body and the rear seat, an upper end of which harness is connected to a harness connecting portion of the inflator, while a lower end of which harness is connected to a battery for the vehicle provided on the vehicle body, and an upper end portion of the harness is mounted on a cut-off portion provided adjacent to the harness connecting portion of the inflator, so that the harness vertically extends while being supported by an outer wall portion of a base accommodating portion.

Such being the case, it is technically possible to avoid a risk of the harness being shifted during a normal driving of the vehicle to cause an interference of the harness with the side airbag, or to cause the harness to be stuck in between the components of the vehicle seat, upon the expanding of the side airbag, to some extent.

However, the side airbag disclosed in Japanese Laid-open Publication 2016-20147 raises the following technical problems.

Firstly, in said side airbag, the durability of the harness is deteriorated due to the supporting configuration of the harness.

More specifically, since the upper end portion of the harness is fitted into the cut-off portion provided adjacent to the harness connecting portion of the inflator so as to be supported by the cut-off portion, an outer surface of the harness tends to be damaged due to such a fitting. In order to prevent such damage, thickening of a protection cover covering an outer surface of the harness is needed. In addition, since the harness is supported at the cut-off portion by being fitted into the cut-off portion to be rapidly bent downwardly and routed toward the bottom surface of the vehicle, there is a risk of the damaged portion fitted into, and thus, supported by the cut-off portion being enlarged with time.

Secondly, the assembly of the side airbag, and the mounting workability of the harness, in particular, cannot be efficiently carried out due to the routing configuration of the harness.

More specifically, since the harness is downwardly routed by the fact that it is drawn out to the backside of the base member from the harness connecting portion of the inflator, a protective enclosure is needed due to the fact that the harness is bared in addition to that a degree of freedom for the routing is low, and thus, it is technically difficult to efficiently mount the harness.

SUMMARY

In view of the above technical problems, an object of the present invention is to provide a side airbag apparatus which is capable of efficiently mounting a harness without badly influencing the durability of the harness.

In view of the above technical problems, according to an aspect of the invention, there is provided a side airbag apparatus provided between a vehicle body and a seat disposed in the vehicle comprising an inflatable side airbag, an inflator which supplies an inside of said side airbag with gas, a base member which includes an accommodating space in which said folded side airbag and inflator are accommodated, and a harness, one end of which harness is connected to said inflator to supply it with power for ignition, said base member comprising a backside surface which faces an inside of the seat and a frontside surface, an opening for said accommodating space protruding toward said frontside surface is formed on said backside surface, a protrusion portion constituting said accommodating space at the backside surface is formed on said frontside surface, and a harness supporting portion is formed below said protrusion portion, which fixes a portion of said harness downwardly extending from said inflator toward the vehicle floor so as to restrict lateral and vertical movements of said harness relative to the frontside surface. Further, said harness extends downwardly from said inflator to the vehicle floor so as to be drawn out from the backside surface to said frontside surface.

According to the side airbag with the above structure, since gas is fed into the side airbag from the inflator which is connected to the side airbag and constitutes a gas generation source after the inflator is supplied with power for ignition via the harness, the side airbag is adapted to expand between the vehicle body and the rear seat.

With respect to the base member including an accommodating space for accommodating the folded side airbag and the inflator, the base member includes the backside surface facing an interior of the rear seat, and the frontside surface, and the backside surface is formed with the opening for the accommodating space which protrudes toward the frontside surface, and the opening for the harness the size of which is large enough for drawing out the harness from the backside surface to the frontside surface, is provided below the protrusion portion, and the harness supporting portion is provided below the opening for the harness on the position of the frontside surface corresponding to the route of the harness which downwardly extends from the inflator to the vehicle floor.

Such being the case, since the harness extends downwardly from the inflator to be drawn out from the backside surface to the frontside surface via the opening for the harness, so that the harness can be routed so as to extend downwardly to the vehicle floor, while the harness can be firmly fixed with its lateral and the vertical movement relative to the frontside surface being restricted, by means of the harness supporting portion, the harness can be efficiently mounted without badly influencing the durability of the harness.

In another embodiment of the present invention, an aperture for said harness, a size of which is large enough to draw out the harness from said backside surface to said frontside surface, may be formed below said protrusion portion, said harness supporting portion is provided below said aperture for said harness, and said harness extends downwardly from said inflator to the vehicle floor to be drawn out from the backside surface via said aperture for said harness to said frontside surface.

In another embodiment of the present invention, said harness supporting portion may be constituted by guide and/or hook and/or clip portions spaced apart from each other and formed on a surface below a portion constituting said accommodating space.

In another embodiment of the present invention, an inclined surface with an opening for said harness may be provided below said protrusion portion, a portion on which said inflator is mounted constitutes a penetrated hole provided on an elongated surface defining a bottom surface of said accommodating space, said inclined surface is interposed between said surface where said guide and/or hook and/or clip portions are provided and said elongated surface in such a way that said surface is in parallel with said elongated surface via a stepped portion.

In another embodiment of the present invention, said inflator may be accommodated in said accommodating space and is oriented to be vertically elongated in such a way that its connecting portion, which is connected to said harness, is oriented downwardly.

In another embodiment of the present invention, the size of said opening for said harness may be determined so as to secure an assembly workability of said harness and a restriction of a movement of said harness, in accordance with the diameter of said harness.

In another embodiment of the present invention, the side airbag apparatus further may comprise a skin member covering said base member accommodating said side airbag and said inflator, from a front of the vehicle body, and said harness is supported so as to be surrounded by said skin member.

DETAILED DESCRIPTION

An embodiment of the side airbag of the present invention will be described in detail, with reference to the drawings.

Figure 1:
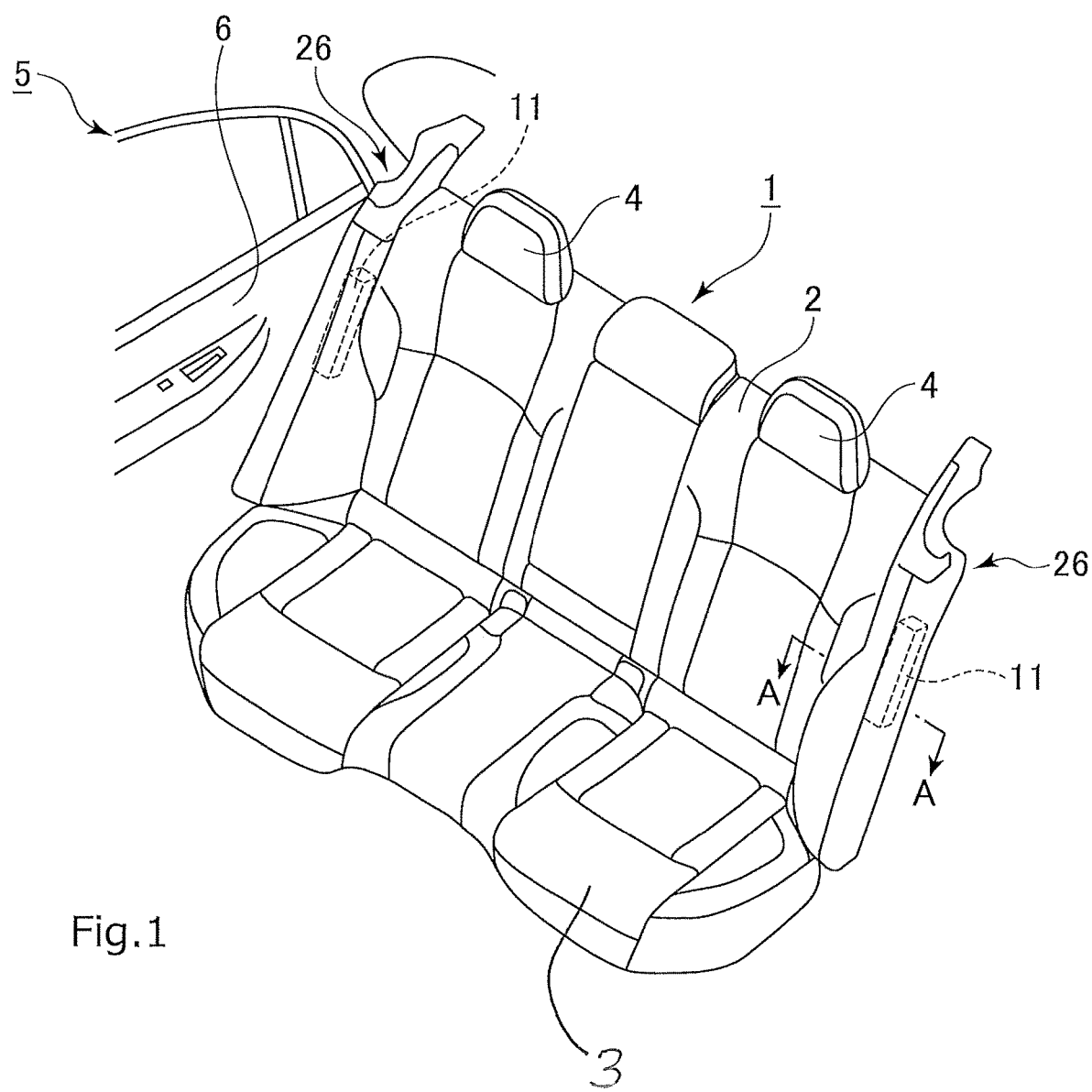
FIG. 1 is a view showing an arrangement of the side airbag apparatus of one embodiment of the present invention.

As shown in FIG. 1, a seat 1 for the vehicle generally comprises a seat back 2 which can be reclined so as to serve as a backrest for a passenger, a seat cushion 3, a rear end of which is connected to a lower end of the seat back 2 and on which the passenger sits, and a head rest 4 which is vertically movably supported by an upper end of the seat back 2 to support a head of the passenger. The seat back 2 includes a seat back frame (not shown) as a frame structure, so that the seat back 2 for the seat 1 for the vehicle is constituted by a pad member 50 being supported by the seat back frame and covered by a skin member 60.

A side airbag apparatus 10 which can expand and develop along an inner surface of a side door 6 upon a side collision of the vehicle, is provided in an outer side portion in the widthwise direction of the seat back 2.

The side airbag apparatus 10 of this embodiment is disposed between the seat back 2 which serves as the backrest of the rear seat and the side door 6 of the vehicle body 5 so as to alleviate an impact applied on the passenger from the side of the vehicle.

In this connection, the side airbag apparatus 10 is arranged on each outer side in the widthwise direction of the seat back 2.

Figure 2:
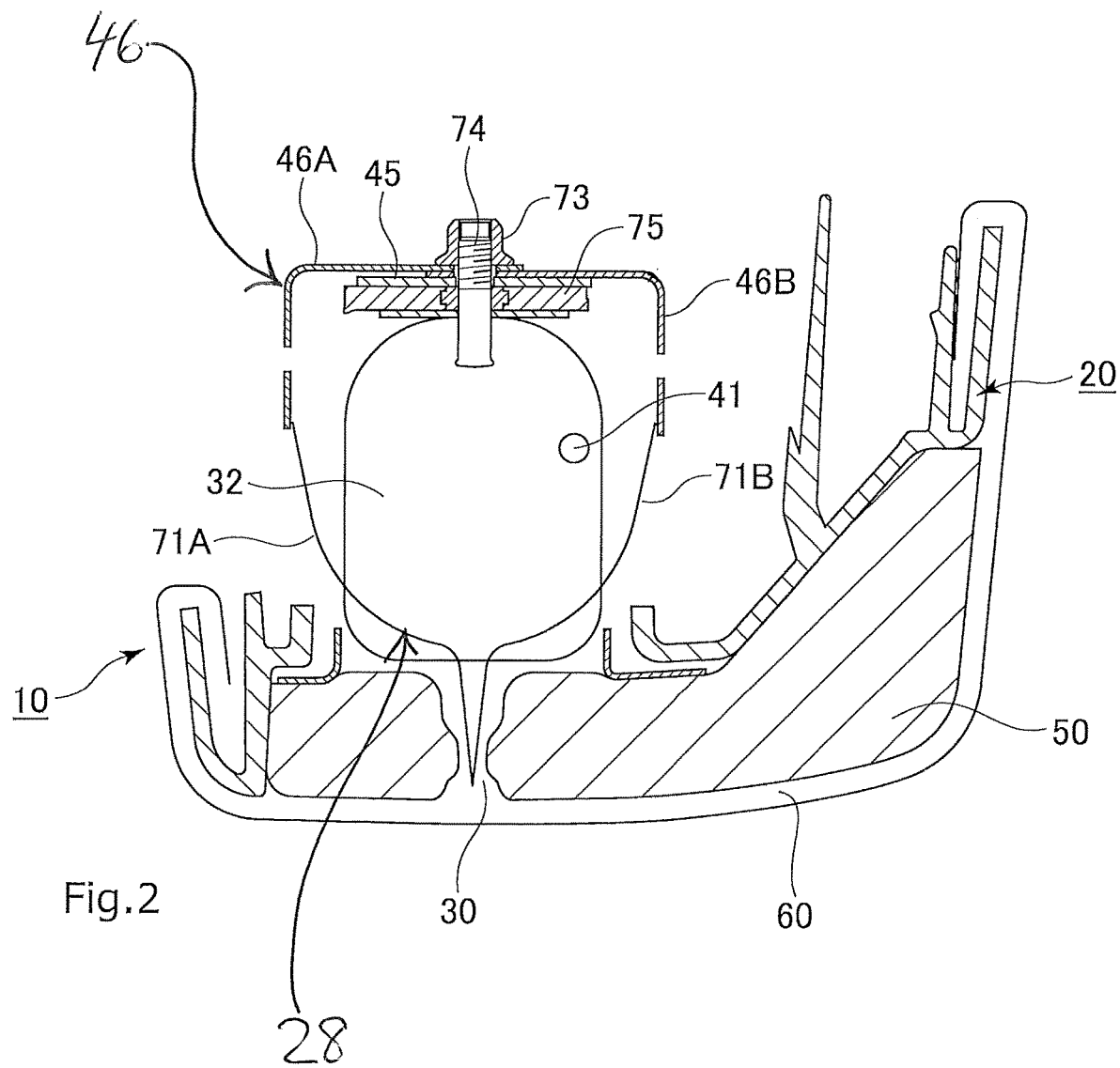
FIG. 2 is a cross sectional view taken along line A-A in FIG. 1 showing a situation in which the side airbag 11 is accommodated.

As shown in FIG. 2, the side airbag apparatus 10 comprises the pad member 50 which is disposed in front of a base member 20 (described later) provided on each side portion of the rear seat, the skin member 60 which covers the base member 20 and the pad member 50 from a front of the vehicle, a side airbag unit 26 which includes a side airbag 11 which can be expanded, and a reinforcing piece 28 one end of which is sewn with the skin member 60 and the other end of which is locked by the base member 20 so as to guide the expanding direction of the side airbag 11.

The pad member 50 is constituted by a cushion member disposed between the skin member 60 and the base member 20.

More specifically, the pad member 50 is arranged in front of the base member 20 by being fixed on a pad mounting portion (not shown) provided on a predetermined position of the base member 20.

A pad opening portion 30 is provided as a vertically elongated opening through which the reinforcing piece 28 is penetrated from the side of the skin member 60 to the side of the base member 20.

In a case where the side airbag 11 expands, and thus, develops, the pad member 50 is adapted to be divided in the widthwise direction of the vehicle and develop in such a way that the pad opening portion 30 serves as a branch point.

In such a case, since the expanding direction of the side airbag 11 is guided by the reinforcing piece 28, the side airbag 11 can be appropriately developed without a portion of the pad member 50 at the front of the vehicle being scattered around.

The skin member 60 is a member which covers the pad member 50 and the base member 20 from a front of the vehicle. A skin cleavage portion (not shown) which serves as a cleavage part upon the expansion of the side airbag is formed with the skin member 60, so that the skin member 60 is adapted to be divided, and thus, develop, in such a way that the skin cleavage portion serves as a branch, in a case where the side airbag 11 expands and develops.

The reinforcing piece 28 is made of a cloth member which guides the side airbag 11 in such a way that the side airbag 11 expands, and thus, develops toward the front of the vehicle, so that it extends between the pad member 50 and the side airbag 11 in the longitudinal direction of the vehicle.

Figure 3:
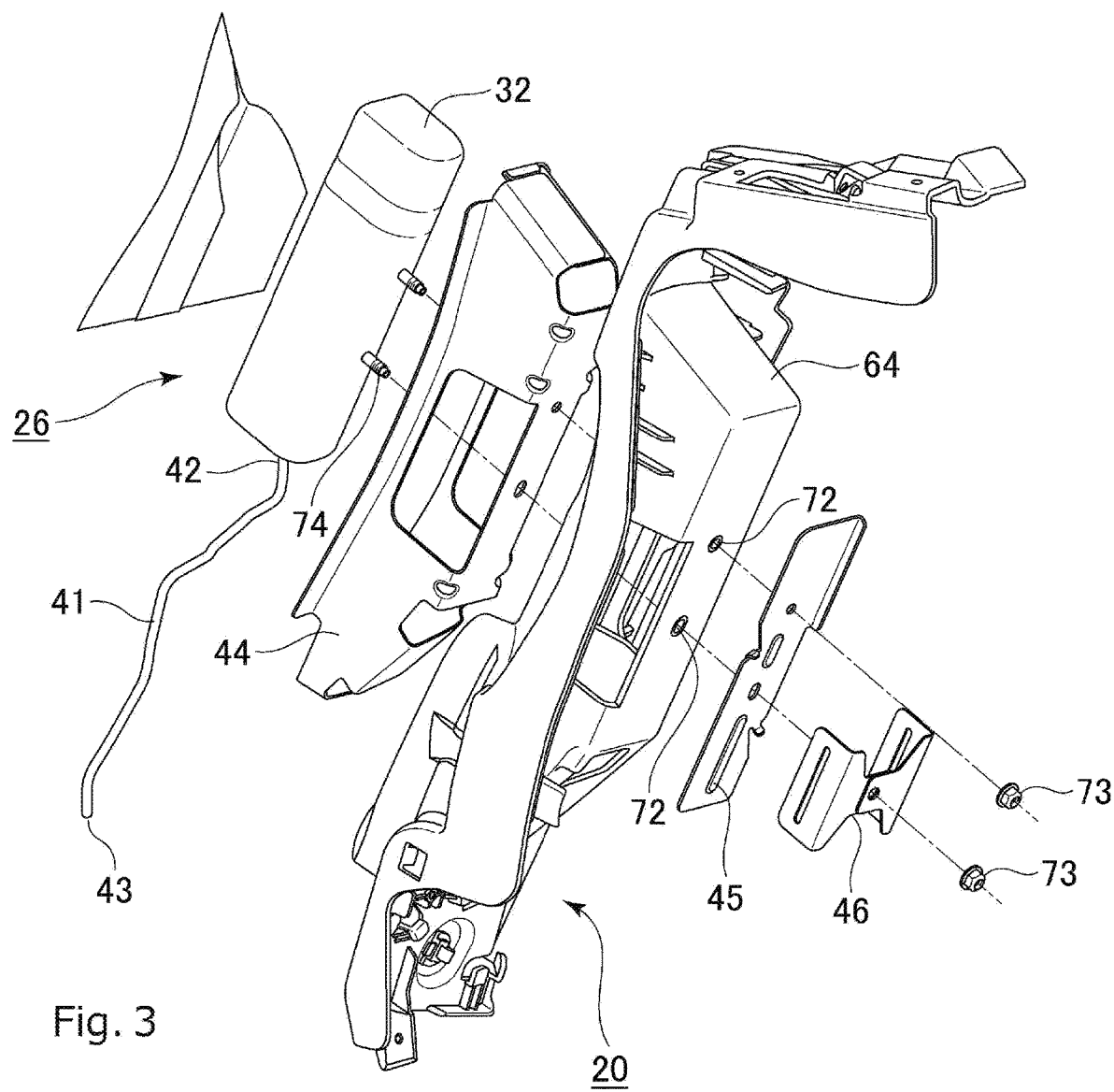
FIG. 3 is an exploded view showing the base member of the side airbag apparatus.
Figure 4:
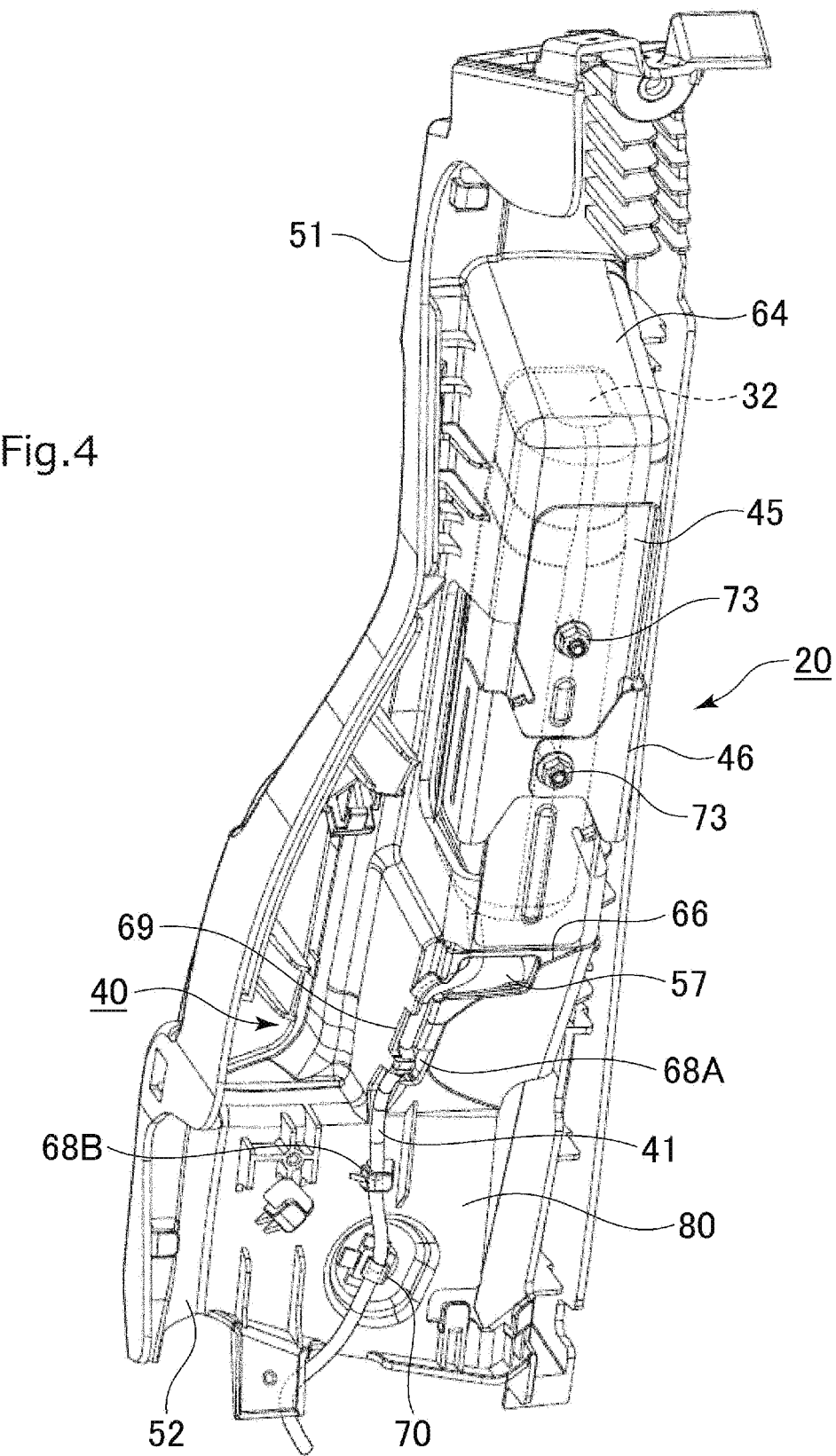
FIG. 4 is a perspective view showing the base member of the side airbag apparatus, as seen from the frontside surface of the base member.
Figure 5:
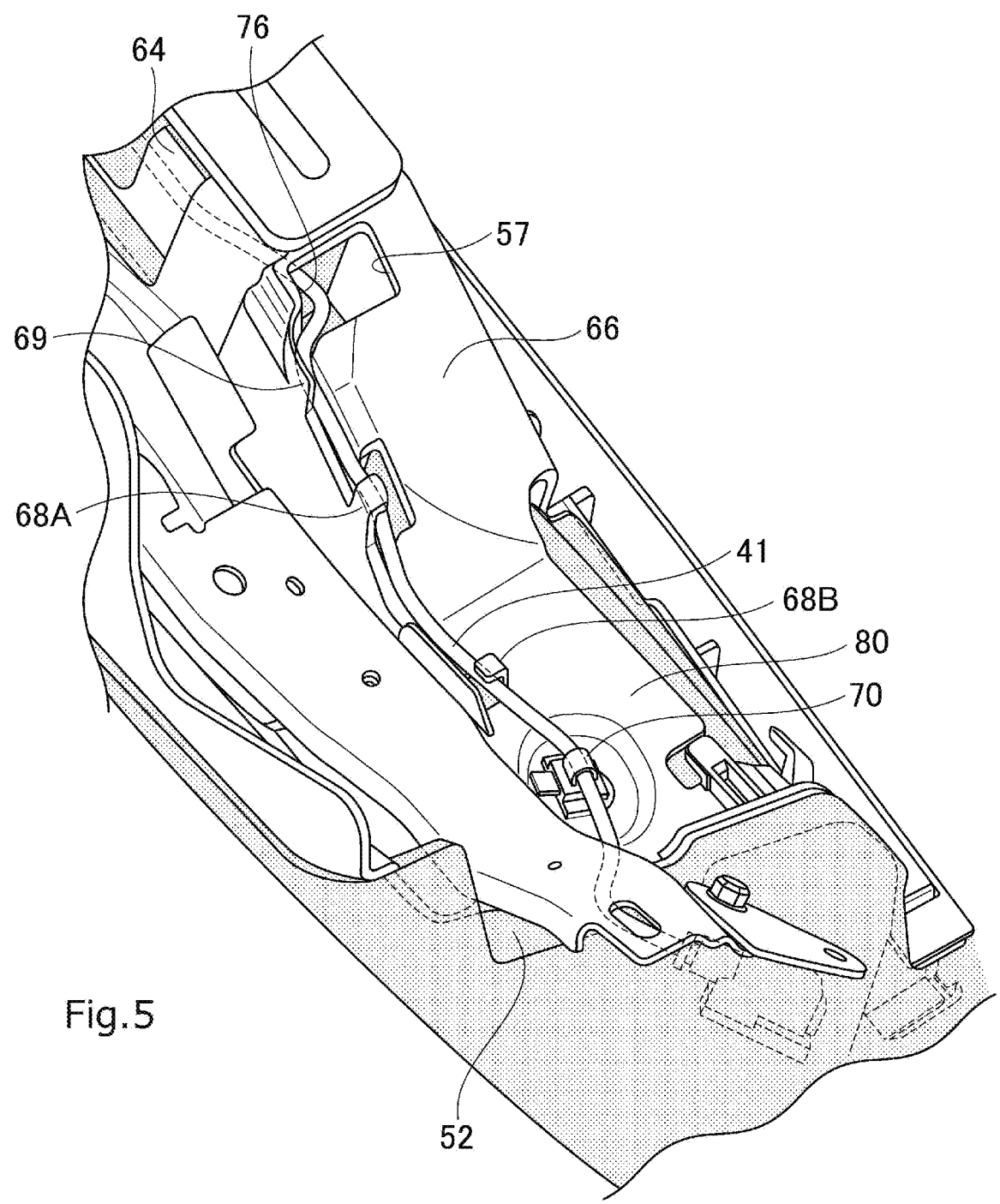
FIG. 5 is a partial detailed perspective view showing a configuration around the harness supporting portion of the base member of the side airbag apparatus.
Figure 6:
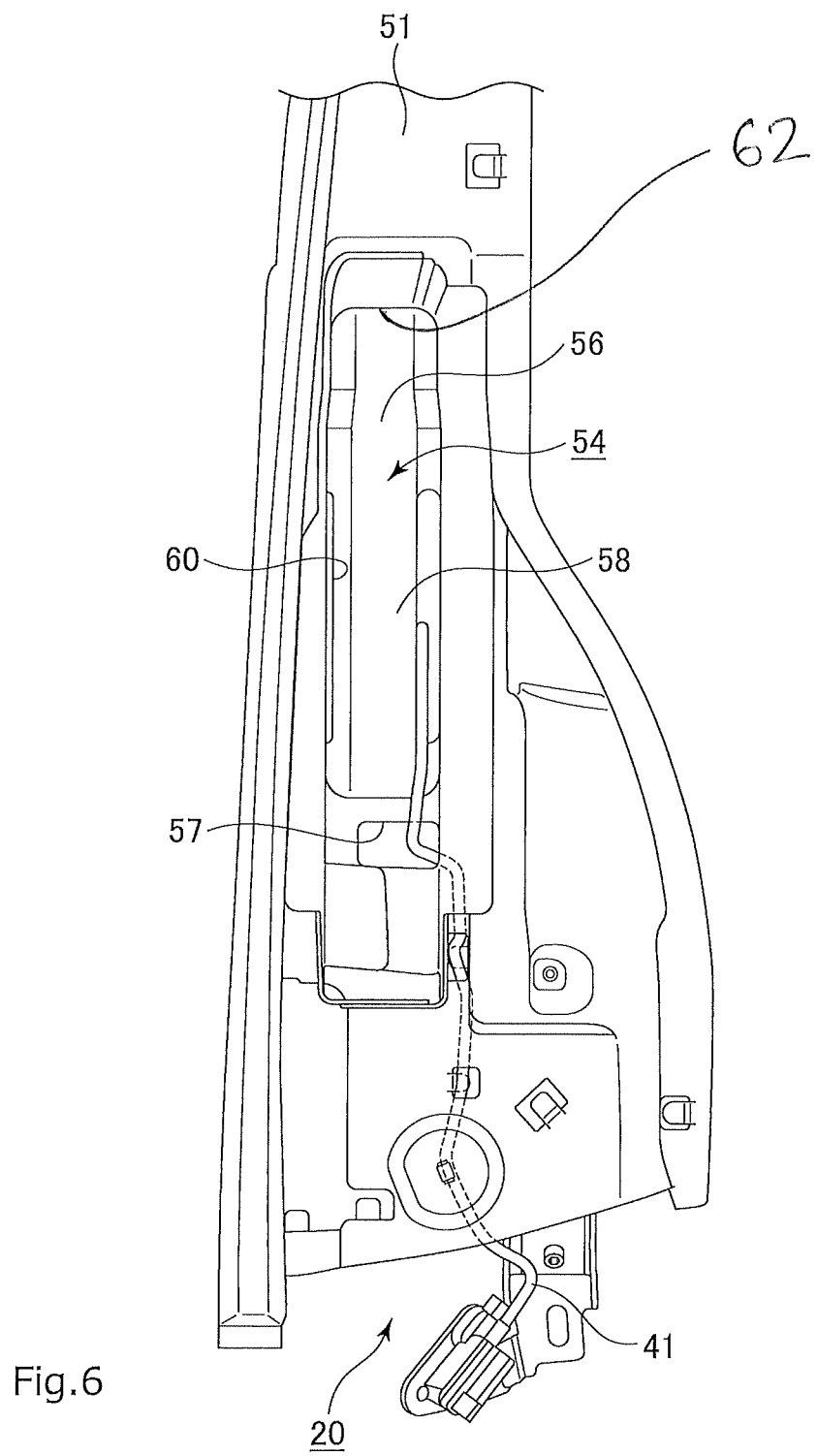
FIG. 6 is a perspective view showing the base member of the side airbag apparatus, as seen from the backside surface of the base member.

As shown in FIG. 3, the side airbag unit 26 generally comprises an inflator 32 which supplies the inside of the side airbag 11 with gas, the base member 20 which accommodates the folded side airbag 11 and the inflator 32, and a harness 41 which is connected to the inflator 32 to supply it with power for ignition.

The side airbag 11 is made of a bag form which can expand like a balloon, and thus, develop toward the front side of the vehicle from the folded configuration, in a case where the impact load is applied to the vehicle from its side.

More specifically, the side airbag 11 is normally kept accommodated in the side portion of the seat back 2 at the side door 6 in a folded form, and is adapted to expand in a case where gas is fed into the side airbag 11 from the inflator 21 which is connected to the side airbag 11 to serve as a gas generation source.

As shown in FIG. 2, the inflator 32 constitutes a gas generator of a substantially elongated cylindrical shape and is disposed in such a way that its longitudinal direction is oriented along the height direction of the seat back 2. A gas injection portion (not shown) which is formed with a gas injection hole (not shown) is provided on one end (a lower end, for instance) of the inflator 32, so that gas is adapted to be fed toward the inside of the side airbag 11 from the gas injection hole.

The inflator 32 includes a harness connection portion which is formed on its lower end portion and is connected to the harness 41, and a screw portion 74 which protrudes from its outer surface toward the side of the vehicle and constitutes an assembly portion which is assembled with the base member 20.

In a case where the impact load from the side of the vehicle is applied on the vehicle, the inflator 32 is supplied with power for ignition from a battery (not shown) for the vehicle disposed at a foot side of the passenger on the vehicle floor via the harness 41, so that the side airbag 11 is caused to expand, and thus, develop, at the side of the passenger.

The harness 41 is constituted by a plurality of bundled electrical wires covered by a corrugated tube and includes a coupler at its end so as to supply the inflator 32 with power for ignition.

As shown in FIG. 3, an upper end portion 42 of the harness 41 is connected to the harness connection portion located at the lower end of the inflator 32, while a lower end portion 43 of the harness 41 is connected to the battery for the vehicle located at the foot side of the passenger on the vehicle floor, so that the harness 41 vertically extends and is supported by the base member 20.

Next, with respect to the base member 20, the structure of the base member 20, the accommodating configuration of the inflator 32, the configuration of the harness 41, the assembly configuration of the harness 41, a portion of the base member 20 on which the inflator 32 is mounted, and the relationship between the supporting portion of the harness 41 and the portion of the base member 20 on which the inflator 32 is mounted will be explained, in this order, with reference to FIGS. 3 to 6.

The inflator 32 is accommodated in a casing 44 of a box type, and the casing 44 is fitted into an accommodating space 54 whose opening 56 faces a backside 51 of the base member 20, while screw portions 74 spaced apart from each other in the height direction and provided on the side portion of the inflator 32 are penetrated through penetrated holes 72 provided on the base member 20, and screwed by nuts 73 from a frontside surface 52 of the base member 20 via a bracket 45 and a reinforcing piece bracket 46. Accordingly, the inflator 32, the casing 44, the base member 20, the bracket 45 and the reinforcing piece bracket 46 are integrally fixed to each other.

(1) Structure of Base Member 20

The base member 20 is an elongated plate member including the backside surface 51 and the frontside surface 52. On the backside surface 51, an opening 56 of the accommodating space 54 which protrudes toward the frontside surface 52 is provided, and the folded side airbag 11 and the inflator 32 are accommodated in the accommodating space 54, while a protrusion portion 64 (defined by a bottom surface, side surfaces, and an upper surface corresponding to a bottom surface portion 58, side surface portions 60, and an upper surface portion 62, respectively,) is provided on the frontside surface 52.

An inclined surface 66 on which a rectangular aperture 57 for the harness is provided below the protrusion portion 64, in order for the harness 41 to be drawn out from the backside surface 51 of the base member 20 to the frontside surface 52 of the base member 20. A guide portion 69, hook portions 68A, 68B, and a clip portion 70 are provided below the inclined surface 66 and are vertically spaced apart from each other.

More specifically, the guide portion 69, the two hook portions 68A, 68B and the clip portion 70 are vertically provided, in this order.

The size of the aperture 57 for the harness may be determined, in accordance with the diameter of the harness 41, in order to provide the assembly workability of the harness 41 and the restriction of the movement of the harness 41. It is preferable that the size of the aperture 57 for the harness is large in order to draw out the harness 41 from the backside surface 51 to the frontside surface 52, since the smaller the size of the aperture 57 for the harness becomes, the lower the assembly workability of the harness 41 becomes. It is preferable that the positions of the hook portions 68A, 68B and the clip portion 70 are provided near one edge 76 of the aperture 57 for the harness, in view of the restriction of the movement of the harness 41.

In this connection, the base member 20 may be preferably fixed on the vehicle body via a bracket (not shown) by means of bolts, in order to mount the base member 20 on the side portion of the rear seat.

2) Accommodation Configuration of Inflator 32

The inflator 32 is accommodated in the accommodating space 54 of the base member 20 while being housed in the casing 44, in such a way that its longitudinal direction is set vertically with respect to the harness connection portion of the inflator 32 so that the harness is oriented downwardly.

(3) Configuration of Harness 41

The harness 41 downwardly extends from the lower end of the inflator 32 at the backside 51 to pass through the aperture 57 for the harness, and thus, extends further downwardly to the vehicle floor at the frontside 52.

(4) Mounting Configuration of Harness 41

A portion of the harness 41 downwardly extending from its upper end to the vehicle floor is fixed in such a way that its lateral and vertical movements can be restricted via the guide portion 69, the hook portions 68A, 68B and the clip portion 70 all of which portions are formed on a surface 80 located below a portion constituting the accommodating space 54 of the base member 20.

The guide portion 69 is a member with an I-shaped cross section which restricts the movement of the harness 41 in one lateral direction and guides the harness 41 in the longitudinal direction. Each of the hook portions 68A, 68B is a member with a L-shaped cross section which restricts the movement of the harness 41 in one lateral direction and in a direction perpendicular to the surface 80. The clip portion 70 is a member with a C-shaped cross section which restricts the movement of the harness 41 in both lateral directions and in the direction perpendicular to the surface 80 by covering most of the periphery of the harness 41. Each of the guide portion 69, the hook portions 68A, 68B and the clip portion 70 may be constituted by a member separate from the base member 20 which is screwed on the frontside surface 52 of the base member 20. In particular, the guide portion 69 and the hook portions 68A, 68B may be formed as calking locking pawls on the frontside surface 52.

With respect to the adjacent hook portions 68A, 68B provided along the route of the harness 41 extending from the inflator 32 to the vehicle floor, the movement of the harness 41 in both lateral directions can be restricted by the orientation of the arrangement (the orientation of the opening of 'L' of the L-shaped cross section) of the one hook portion being set adverse to that of the other hook portion.

The accommodating space 54 is provided on the side of the backside surface 51 so that the protrusion portion 64 protrudes toward the frontside surface 52 of the base member 20, while the inflator 32 is accommodated in the accommodating space 54 and the lower surface 80 which is substantially parallel to the bottom surface 58 of the accommodating space 54 is provided below the protrusion portion 64.

The inclined surface 66 is provided at a stepped portion between the bottom surface 58 and the lower surface 80, and the aperture 57 for the harness is provided on the inclined surface 66.

Such being the case, in the route of the harness 41 from the inflator 32 to the vehicle floor, an extreme bent portion of the harness 41 can be avoided, which contributes to the improvement of the durability of the harness 41.

(5) Portion on which Inflator 32 is Mounted

The penetrated holes 72 for the screw portions 74 provided on the inflator 32 are provided on the bottom surface defining the bottom surface 58 of the accommodating space 54. The inflator 32 housed in the casing 44 is accommodated in the accommodating space 54 and is fixed in the accommodating space 54 by the nuts 73 with the screw portions 74 penetrating through the penetrated holes 72.

(6) Relationship of Harness Supporting Portion of Base Member 20 with Portion on which Inflator 32 is Mounted The harness supporting portion of the base member 20 is formed on the lower surface 80 below a portion (protrusion portion 64) defining the accommodating space 54 of the base member 20 and comprises the hook portions 68A, 68B and the clip portion 70 which are vertically spaced apart from each other. The portion on which the inflator 32 is mounted comprises the penetrated holes 72 provided on an elongated surface defining the bottom surface 58 of the accommodating space 54. The lower surface 80 on which the hook portions 68A, 68B and the clip portion 70 are provided is formed parallel to the elongated surface via the inclined surface 66 which forms the stepped portion.

As described above, the harness 41 is supported by the guide portion 69, the hook portions 68A, 68B and the clip portion 70 at a deep space below the protrusion portion 64 on the frontside surface 52 of the case member 20, whereby the harness 41 is protected by the protrusion portion 64. Therefore, the protruding height of the protrusion portion 64, that is to say, the depth of the bottom surface 58 of the accommodating space 54 may be determined, in view of the above aspect.

This can omit a need to provide a conventional protective enclosure which encloses and thus protects the harness 41.

The distance between the guide portion 69 and the hook portion 68A, or the distance between the hook portion 68B and the clip portion 70 may be determined so as to reliably restrict the lateral and vertical movements of the harness 41.

Next, a method of mounting the side airbag unit 26 will be described.

Firstly, ends 71A, 71B of the reinforcing piece 28 are respectively sewn to parts 46A, 46B of the reinforcing piece bracket 46 and other ends of the reinforcing piece 28 are sewn to the skin cleavage portion of the skin member 60, so as to make the reinforcing piece 28, the reinforcing piece bracket 46, and the skin member 60 integral with each other. This allows these integral components to be assembled with each other by passing these integral components through the pad member 50.

Then, the inflator 32 housed in the casing 44 along with the side airbag 11 are accommodated within the accommodating space 54 of the base member 20 in such a way that each of the screw portions 74 are passed through the corresponding penetrating hole 72 of the base member 20 toward the frontside surface 52, and the screw portion 74 is screwed by means of the nut 73 via a collar 75, the bracket 45 and the reinforcing piece bracket 46 from the side of the frontside surface 52 of the base member 20, so that the inflator 32, the casing 44, the base member 20, the bracket 45 and the reinforcing piece bracket 46 are integrally fixed with each other.

In such a case, one end of the harness 41 is connected to the harness connection portion of the inflator 32.

This causes the other end of the reinforcing piece 28 to be fixed on the side of the base member 20 via the reinforcing piece bracket 46.

Then, the other end of the harness 41 is drawn out from the backside surface 51 to the frontside surface 52 via the aperture 57 of the base member 20, whereby the harness 41 is supported by the hook portions 68A, 68B and the clip portion 70 to be connected to the power source on the vehicle floor.

Then, the pad member 50 is provided, and the outer side of the pad member 50 is covered with the skin member 60, while the base member 20 is screwed on the side portion of the rear seat by means of nut.

The assembly of the side airbag unit 26 is completed by the above operations.

According to the side airbag 10 with the above structure, since gas is fed into the side airbag 10 from the inflator 32 which is connected to the side airbag 10 and constitutes a gas generation source after the inflator 32 is supplied with power for ignition via the harness 41, the side airbag 10 is adapted to expand between the vehicle body and the rear seat.

With respect to the base member 20 including the accommodating space 54 for accommodating the folded side airbag 10 and the inflator 32, the base member 20 includes the backside surface 51 facing the interior of the rear seat, and the frontside surface 52, and the backside surface 51 is formed with the opening 56 for the accommodating space 54 which protrudes toward the frontside surface 52, and the aperture 57 for the harness 41 (the size of which is large enough for drawing out the harness 41 from the backside surface 51 to the frontside surface 52) is provided below the protrusion portion 64, and the harness supporting portion is provided below the aperture 57 for the harness 41 on the position of the frontside surface 52 corresponding to the route of the harness 41 which downwardly extends from the inflator 32 to the vehicle floor.

Such being the case, since the harness 41 extends downwardly from the inflator 32 to be drawn out from the backside surface 51 to the frontside surface 52 via the aperture 57 for the harness 41, so that the harness 41 can be routed so as to extend downwardly to the vehicle floor, while the harness 41 can be firmly fixed with its lateral and vertical movements relative to the frontside surface 52 being restricted, by means of the harness supporting portion, the harness 41 can be efficiently mounted without badly influencing the durability of the harness 41.

As described above, the preferred embodiment of the present invention was described in detail, however, it is evident that those skilled in the art could modify or change the embodiment in various manners without departing from the scope of the present invention.

For instance, in this embodiment, the side airbag apparatus 10 for the rear seat of the vehicle was described, however, the side airbag apparatus 10 is applicable to the front seat of an automobile, the seat for the vehicle such as a train compartment, a bus, and the seat for a large vehicle such as an airplane, a ship.

For instance, in this embodiment, the side airbag apparatus 10 for the rear seat of the seat back of the three split type was described, however, the side airbag apparatus 10 is applicable to the seat back of the two split type in the widthwise direction of the rear seat.

For instance, in this embodiment, the guide portion 69, the hook portions 68A, 68B, and the clip portion 70 were provided in this order, along the route of the harness 41 extending from the inflator 32 to the vehicle floor, as a harness supporting portion, however, any combination of these components can be adopted, so long as the lateral and vertical movements of the harness 41 can be restricted by such a harness supporting portion.

What is claimed is:

1. A side airbag apparatus for a vehicle provided between a vehicle body and a vehicle seat disposed in the vehicle, said side airbag apparatus comprising:
an inflatable side airbag, said inflatable side airbag having a folded configuration;
an inflator configured to supply an inside of said inflatable side airbag with gas;
a harness, said harness having an end connected to said inflator to supply said inflator with power for ignition; and
a base member having a back side surface disposed to face an interior of the vehicle seat and a front side surface facing away from the back side surface, said base member having a protrusion portion disposed at said front side surface and projecting in a direction away from said back side surface, said protrusion portion defining an accommodating space disposed at said back side surface of said base member and opening in a direction away from said front side surface, said inflatable side airbag in said folded configuration and said inflator both being disposed in said accommodating space, said harness being drawn out from said back side surface of said base member to said front side surface of said base member and extending vertically downwardly from said inflator to a vehicle floor, said base member further including a harness supporting portion disposed vertically below said protrusion portion at said front side surface, said harness supporting portion being configured to restrict both lateral and vertical movements of a portion of said harness relative to said front side surface of said base member as said harness extends vertically downwardly from said inflator to the vehicle floor, said protrusion portion having a protruding height dimension, said protruding height dimension being oriented in a direction from said back side surface to said front side surface of said base member, said portion of said harness being disposed vertically below said protrusion portion at said front side surface of said base member, and said protruding height dimension of said protrusion portion being set such that said protrusion portion is disposed to protect said portion of said harness from damage at said front side surface of said base member.

2. The side airbag apparatus according to claim 1, wherein said base member includes an aperture disposed vertically below said protrusion portion and said harness supporting portion is disposed vertically below said aperture, said aperture being of a size sufficient to permit said harness to pass therethrough, said end of said harness being connected to said inflator at said back side surface of said base member and extending from said back side surface and through said aperture to said front side surface and vertically downwardly to the vehicle floor.

3. The side airbag apparatus according to claim 2, wherein said harness supporting portion comprises one or a combination of guide portions, hook portions or clip portions disposed in a spaced-apart manner from one another along a harness-supporting surface disposed vertically below said protrusion portion at said front side surface of said base member.

4. The side airbag apparatus according to claim 3, wherein said base member includes an inclined surface disposed vertically below said protrusion portion at said back side surface, said aperture being disposed in said inclined surface, said protrusion portion including an elongated wall portion having an elongated surface disposed at said back side surface of said base member and defining part of said accommodating space, said inflator being mounted to said elongated wall portion and said inclined surface being interposed between said harness-supporting surface and said elongated wall portion such that said harness-supporting surface is disposed in parallel with said elongated wall portion but is offset therefrom via a stepped portion of said base member.

5. The side airbag apparatus according to claim 2, wherein said inflator is disposed in said accommodating space such that a portion of said inflator connected to said end of said harness is oriented downwardly.

6. The side airbag apparatus according to claim 2, wherein said aperture is sized based on a diameter of said harness for ease of assembly of said harness and to restrict movement of said harness relative to said back side surface.

7. The side airbag apparatus according to claim 1, further including a skin member covering said base member, in which said side airbag and said inflator are accommodated, from a front of the vehicle, said skin member surrounding said harness.

8. The side airbag apparatus according to claim 1, wherein said base member includes an aperture disposed vertically below said protrusion portion and said harness supporting portion is disposed vertically below said aperture, said harness supporting portion including a harness supporting surface disposed on said base member so as to be offset rearwardly, with respect to a front-to-back direction of said base member, from an outermost, with respect to the front-to-back direction, extent of said protrusion portion, said end of said harness being connected to said inflator at said back side surface of said base member and said harness extending from said back side surface and through said aperture to said front side surface and vertically downwardly along said harness supporting surface to the vehicle floor.

9. The side airbag apparatus according to claim 8, wherein said protrusion portion includes an elongated wall portion having an elongated outer surface disposed at said front side surface of said base member and forming said outermost extent of said protrusion portion, and said harness supporting surface is substantially parallel to said elongated outer surface but is rearwardly offset therefrom.

* * * * *